United States Patent [19]

Takahashi et al.

[11] Patent Number: 4,742,840

[45] Date of Patent: May 10, 1988

[54] ROLL-OVER VALVE FOR MOTOR VEHICLE

[75] Inventors: Teruo Takahashi, Zama; Naotoshi Mitsui, Komoro; Hideaki Togashi, Sakado, all of Japan

[73] Assignees: Nissan Motor Co., Ltd., Yokohama; Kabushiki Kaisha Tsuchiya Seisakusho, Tokyo, both of Japan

[21] Appl. No.: 943,876

[22] Filed: Dec. 19, 1986

Related U.S. Application Data

[63] Continuation of Ser. No. 865,097, May 20, 1986, abandoned.

[30] Foreign Application Priority Data

May 20, 1985 [JP] Japan .................................. 60-107976

[51] Int. Cl.[4] ............................................. F16K 17/36
[52] U.S. Cl. ....................................................... 137/43
[58] Field of Search ............................. 137/38, 39, 43

[56] References Cited

U.S. PATENT DOCUMENTS 3,996,951 6/1978 Parr .......................................... 137/43
4,095,609 1/1978 Martin ..................................... 137/43

FOREIGN PATENT DOCUMENTS 51-47018 4/1976 Japan .
59-2624 1/1984 Japan .

Primary Examiner—Robert G. Nilson
Attorney, Agent, or Firm—Foley & Lardner, Schwartz, Jeffery, Schwaab, Mack, Blumenthal & Evans

[57] ABSTRACT

A roll-over valve includes a valve body wherein a raised seat portion which a position sensitive ball rests on is disposed below an inlet opening via which fuel vapors enter into the valve body chamber. A ball follower has a top member disposed below the inlet opening and adapted to close the inlet upon being moved toward the inlet by the ball.

8 Claims, 5 Drawing Sheets

ROLL-OVER VALVE FOR MOTOR VEHICLE

This application is a continuation of application Ser. No. 865,097, filed May 20, 1986, now abandoned.

BACKGROUND OF THE INVENTION

The present invention relates to a roll-over valve which prevents leakage of fuel from a motor vehicle fuel tank through a vent line when the automobile is tilted in excess of a predetermined angle or has been tilted and is upside down.

In order to minimize the evaporative loss of fuel to the atmosphere from motor vehicle fuel tanks, a vent line is typically attached to the tank for directing fuel vapors to storage containers such as to the fuel cannister and/or to the engine such as the intake manifold. Such vent lines may be susceptible to fuel leakage from the fuel tank in the event of an accidental roll-over of the automobile or even when the automobile is tilted to an extreme angle such as may occur if an automobile runs off the road over an embankment or into a ditch. Fuel leakage is to be avoided, if possible. Thus, it has been common to include a positionally sensitive roll-over valve in the vent line to close it when the automobile has been tilted in excess of a predetermined angle or has rolled over and is upside down. The closed valve prevents leakage of fuel from the tank through the vent lines and thus minimizes the possibility of a fire hazard which may result therefrom.

U.S. Pat. No. 4,095,609 issued to Martin on Jan. 20, 1978 discloses a roll-over valve. This known roll-over valve includes a heavy ball resting on a conical seat inside a valve body chamber. The valve body chamber includes an inlet connected to the fuel tank and an upper outlet disposed immediately above the ball. A movable cage encloses the ball between top and bottom members so as to move with it as the valve is inclined from an upright position and the ball tends to roll up the conical surface on which it rests, thus moving the cage upwardly. The top member of the cage is adapted to close an opening through which the outlet communicates with the valve chamber when this occurs. When the valve is returned to its normal upright position and the ball returns to its center of the seat, the ball urges the cage by pressing its bottom member downwardly, thus positively opening the outlet.

Since the top of the cage closes the outlet opening and the inlet always communicates with the valve body chamber, liquid fuel from the fuel tank may enter the valve body chamber through the vent line when the vehicle carrying the valve is inclined to an angle which is considered abnormal such as when the automobile has rolled over and is upside down. Thus, foreign matters contained in liquid fuel may form deposits on top of the cage member and conical surface. Deposits formed on them increase the possibility that the outlet opening is not completely closed by the top cage member when the ball rolls up the conical surface. In order to ensure good response upon the actuation of the cage as the ball rolls up or down the conical surface, the bottom member of the cage takes the form of a light weight structure such as a rail. Thus, there is the possibility that the bottom member may be broken upon receiving an impact by the ball when the valve is subject to a great acceleration. If the bottom cross member is broken, the top cage member may continue to close the outlet opening once it has been urged to move toward the outlet opening by the ball. This is because the known roll-over valve reacts positively to open itself by contacting the ball to the bottom cross member of the cage.

An object of the present invention is to provide an improved roll-over valve which does not allow the entry of liquid fuel into the valve body chamber and which is free from the problem that the valve stays undesirably closed.

SUMMARY OF THE INVENTION

According to the present invention, the roll-over valve includes a valve body wherein a seat which a position sensitive ball rests on is disposed in the valve body chamber below an inlet communicating with the valve body chamber and connected to a motor vehicle fuel tank. It also includes a follower for the ball which has a top member disposed below the inlet and adapted to close the inlet upon being moved toward the inlet by the ball. The follower is not provided with a bottom cross member so that its opening movement is not positively caused by the ball, but it is caused by its inertia due to the weight of the follower and a pressure differential created between the inlet and the valve body chamber upon returning the valve to an upright open position. Thus, opening of the valve is not positively caused by the ball although closing is positively caused by the ball. Since it is the inlet that is closed when the automobile has been tilted in excess of a predetermined degree, the entry of liquid fuel into the valve body chamber is prevented.

DESCRIPTION OF THE PREFERRED EMBODIMENTS

An improved roll-over valve according to the present invention is used in the vent line between the fuel tank of a motor vehicle and the utilization means to which the vent line extends, such as a charcoal cannister and/or the engine intake manifold to prevent leakage of liquid fuel from the fuel tank.

Figure 1:
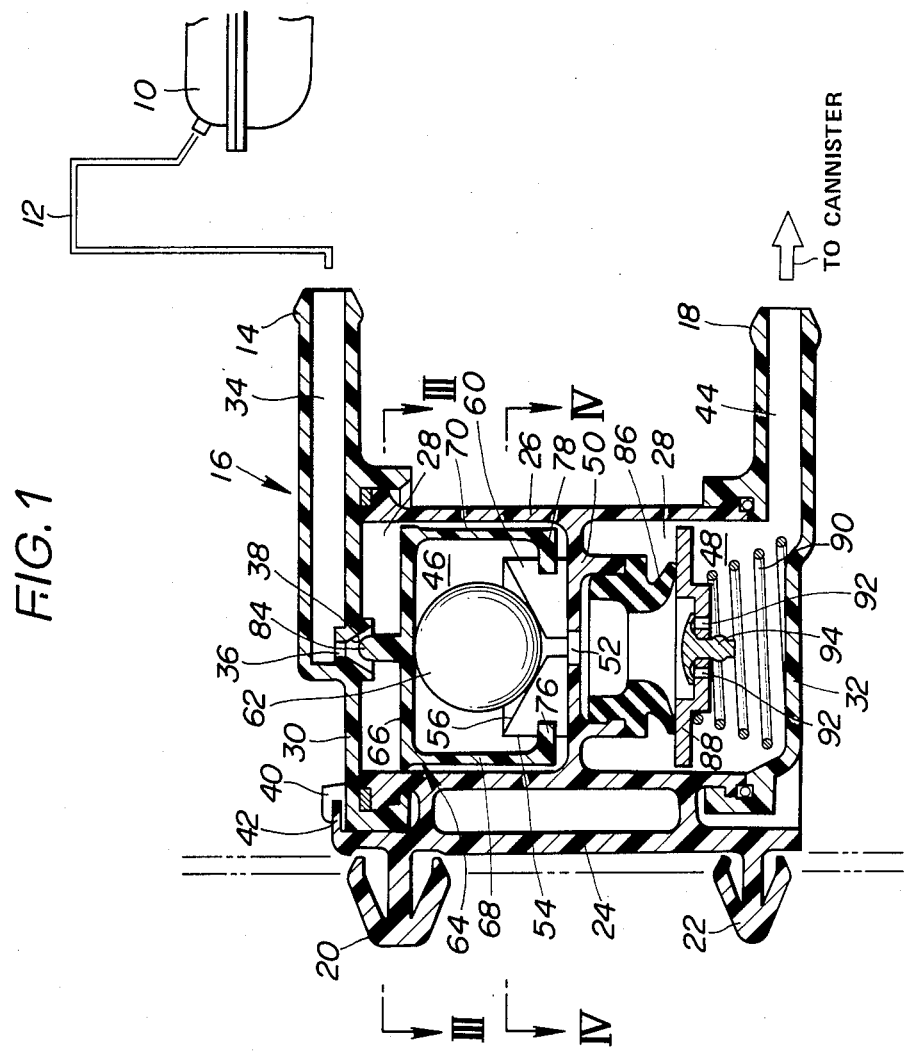
FIG. 1 is a vertical section of a first embodiment of a roll-over valve taken along line I—I of FIG. 2 joined with a vertical section taken along line II—II of FIG. 2 showing it in its upright "open" position and schematically its connection into the vent line of a fuel tank.

FIG. 1 shows an automobile gasoline fuel tank 10 having a vent line schematically indicated at 12 to which the upper inlet 14 of the roll-over valve 16 is attached and through which fuel vapor may be vented from the lower outlet 18 of the valve 16 to a cannister.

FIG. 1 shows the roll-over valve 16 in the upright and open position. Attachment to the motor vehicle may be accomplished by means of an upper clip 20 and a lower clip 22 formed on an attachment plate 24. The clips 20 and 22 have different sizes so as to prevent the roll-over valve 16 from being mounted upside down.

Figure 2:
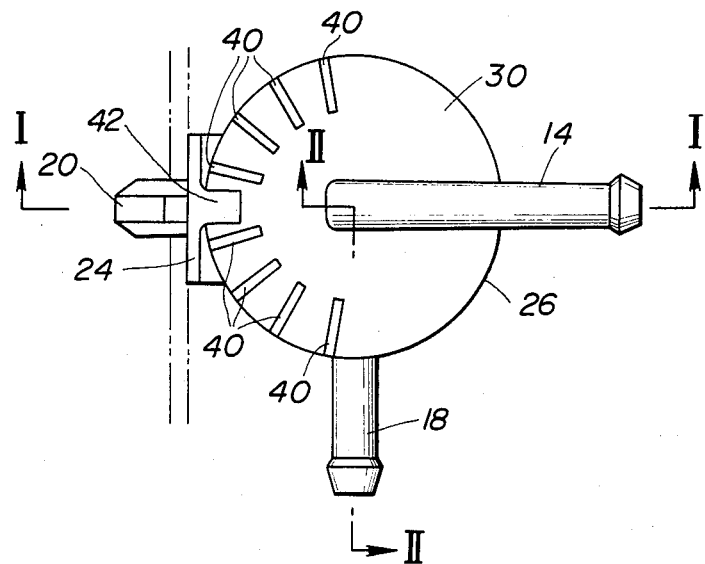
FIG. 2 is a top elevational view of the exterior of the valve.
Figure 3:
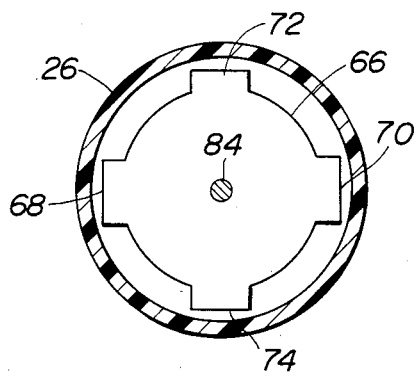
FIG. 3 is a sectional view of the valve taken along line III—III of FIG. 1.
Figure 5:
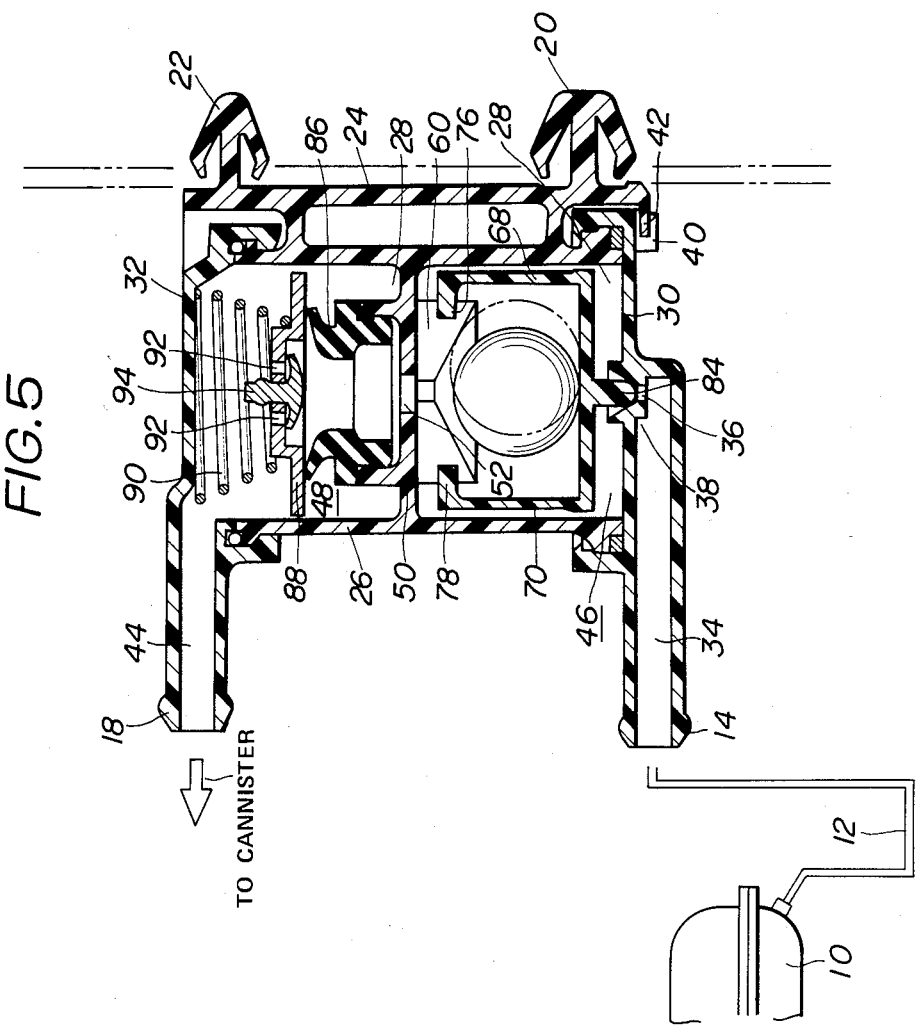
FIG. 5 is the vertical sectional view of the valve showing it in a "closed" condition which it assumes when an automobile carrying the valve has rolled over.

Roll-over valve 16 comprises a valve body which may be formed by a generally cylindrical body portion 26 defining a valve chamber 28. The cylindrical portion 26 is formed integral with the attachment plate 24 as shown in FIGS. 1 and 2. The valve body also includes top and bottom closure members 30 and 32 which seal cylindrical body portion 26 and close valve chamber 28. Top closure member 30 includes the inlet 14 which forms an inlet passage 34 and which communicates with valve chamber 28 by means of opening 36 to allow the entrance of fuel vapors from the vent line 12 into valve chamber 28. Opening 36 is preferably centrally located in top closure member 30 and forms an interior seat portion 38 by means of which opening 36 may be closed as shown in FIG. 5. Top closure member 30 may preferrably include a plurality of positioning ribs 40 as shown in FIG. 2. The integral stop 42 of attachment plate 24 may be positioned between any two adjacent ribs 40 to point the direction of inlet 14 in any dirction as desired. Bottom closure member 32 may include the outlet 18 which forms an outlet passage 44 and which communicates with valve chamber 28 to allow the discharge of fuel vapors from valve chamber 28 into the cannister.

Figure 4:
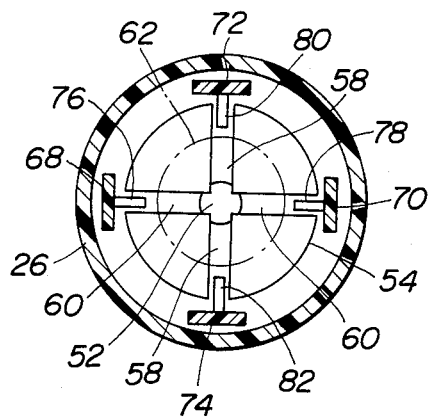
FIG. 4 is a sectional view of the valve taken along line IV—IV of FIG. 1.

Valve chamber 28 is divided into upper and lower chamber portions 46 and 48 by means of the intergral partition 50 of cylindrical portion 26. Both chamber portions 46 and 48 communicate with each other via a central opening 52 of partition 50. Upper chamber portion 46 includes a raised seat portion 54 which terminates at its upper end in a conical surface 56. Raised seat 54 is preferably cylindrical as shown in FIG. 4 and is spaced from the side walls of the valve body cylindrical portion 26. Raised seat 54 is shown divided into four sections by two slots 58 and 60 which extend across the raised seat 54 and downwardly into it. Slots 58 and 60 communicate with opening 52 formed through the partition 50, thus providing spaces for passage of fuel vapors.

A heavy ball 62 rests on conical surface 56 in a freely movable condition so as to be movable upon tilting or inclination of roll-over valve 16 from the upright position shown in FIG. 1 to a roll-over position such as shown in FIG. 5 to allow ball 62 to roll upwardly on the inclined surface of conical seat surface 56 and to return to its centered rest or normal position as shown in FIG. 1 upon return of the valve 16 to its upright position.

Roll-over valve 16 also includes a ball follower generally designated at 64 which has a flat planar top member 66, flat rectangular side members 68, 70, 72 and 74. Side members 68, 70, 72 and 74 have their bottom portions bent inwardly to form inwardly projecting bottom members 76, 78, 80 and 82, respectively. As shown in FIG. 1, top member 66 is disposed below inlet opening 36 and includes an upwardly projecting valve element 84 disposed to seat on seat 38 as shown in FIG. 5. Ball follower 64 is arranged in the upper chamber portion 46 for reciprocal movement or up and downward movement therein jointly with movement of ball 62. To this end, inwardly projecting bottom members 76 and 78 are disposed in slot 60, and the other two bottom members 80 and 82 are disposed in slot 58 for vertical reciprocal movement therein jointly with movement of ball 62.

It is perferrable to prevent excessive rise in pressure created by fuel vapors within upper chamber portion 46. To this end, lower chamber portion 48 includes an elastomeric annular lip-like valve element 86 which is fixedly supported by partition 50. Annular valve element 86 is disposed below opening 52 and seated by a valve element in the form of a disc 88 which is urged by a compression spring 90. Orifices 92 are formed through the centeral recessed portion of the valve disc 88 and they are closed by an one-way check valve in the form of a poppet valve 94. Valve 94 is open to provide for passage of air through orifices 92 when the interior pressure of fuel tank 10 drops below the atmospheric level.

When roll-over valve 16 is in the upright position as shown in FIG. 1, valve element 86 of ball follower 64 is disengaged from seat portion 38 because of its own weight and the interior pressure of fuel tank 10. Thus, the interior of the upper chamber portion 46 is maintained at high pressure level. The fuel tank interior pressure within upper chamber portion 46 urges valve disc 88 against spring 90 and disengaged from annular seat 86 to allow fuel vapors from opening 52 to flow into outlet passage 44 toward the cannister. Even if fuel vapor pressure in the upper chamber portion 46 changes due to vibration of fuel tank 10, valve disc 88 acts to prevent entry of fuel vapors from lower chamber portion 48 into upper chamber portion 46 so that ball follower 64 is free from chatter. When the fuel tank interior pressure tends to drop below the atmospheric level, valve 94 opens to allow entry of atmospheric air into upper chamber portion 46, thus preventing such undesirable drop in pressure.

When roll-over valve 16 assumes a condition as shown in FIG. 5 as may occur when the automobile has rolled over and is upside down, valve element 84 seats the seat portion 38 to close inlet opening 36 by weight of ball 62 to prevent leakage of fuel. Since the inlet opening 38 is closed, the undesirable entry of liquid fuel into valve chamber 28 is prevented. When ball 62 returns to normal center position after roll-over valve 16 assumes the upright position as shown in FIG. 1 again, the fuel tank interior pressure positively assists opening movement of ball follower 64. Thus, valve disc 88 disengages from seat portion 38 to open inlet opening 36 immediately after roll-over valve 16 returns to the upright position shown in FIG. 1. Since follower 64 does not bear the stress by ball 62 at inwardly projecting bottom portions 76, 78, 80 and 82, the possibility that follower 64 might be damaged by ball 62 is minimized.

Figure 6:
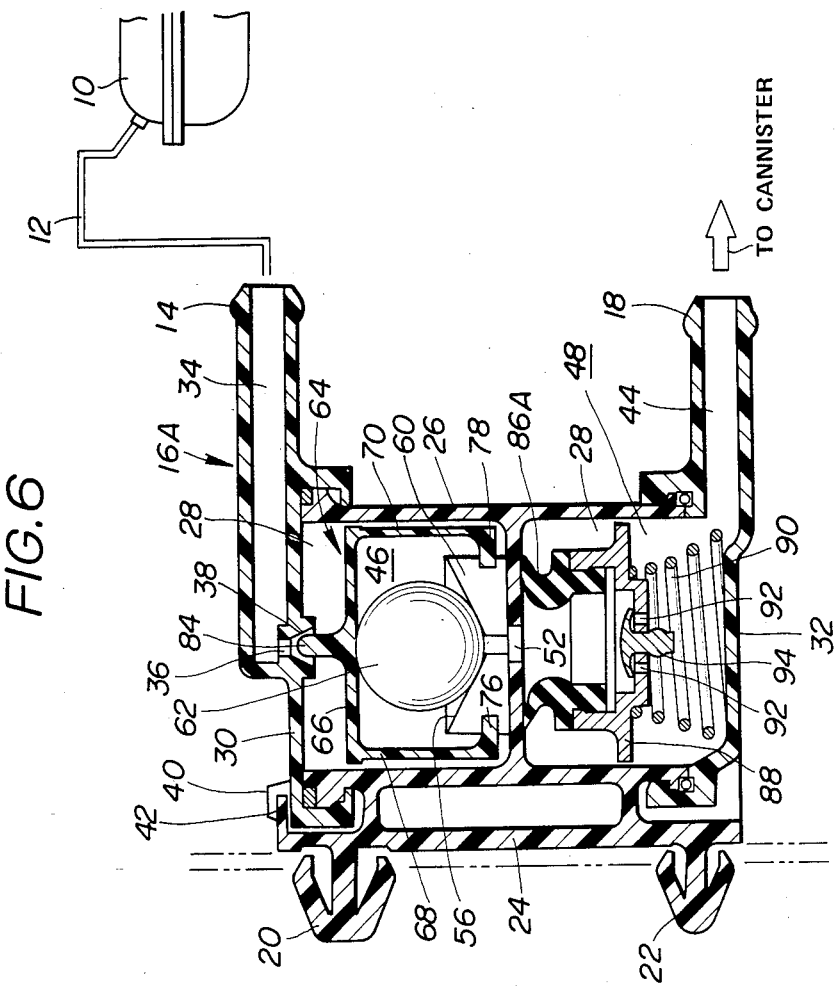
FIG. 6 is a vertical sectional view similar to FIG. 1 showing a second embodiment.

FIG. 6 shows a second embodiment of roll-over valve which is generally designated by 16A. Roll-over valve 16A is substantially similar to roll-over valve 16 shown in FIG. 1 except the position of the annular lip-like valve element 86. As shown in FIG. 6, an annular lip-like valve element which is now designated by 86A is fixedly supported by a disc-like valve element 88 for integral movement therewith. In this embodiment annular valve element 86A seats on lower surface portion of a partition 50 to close an opening 52.

Figure 7:
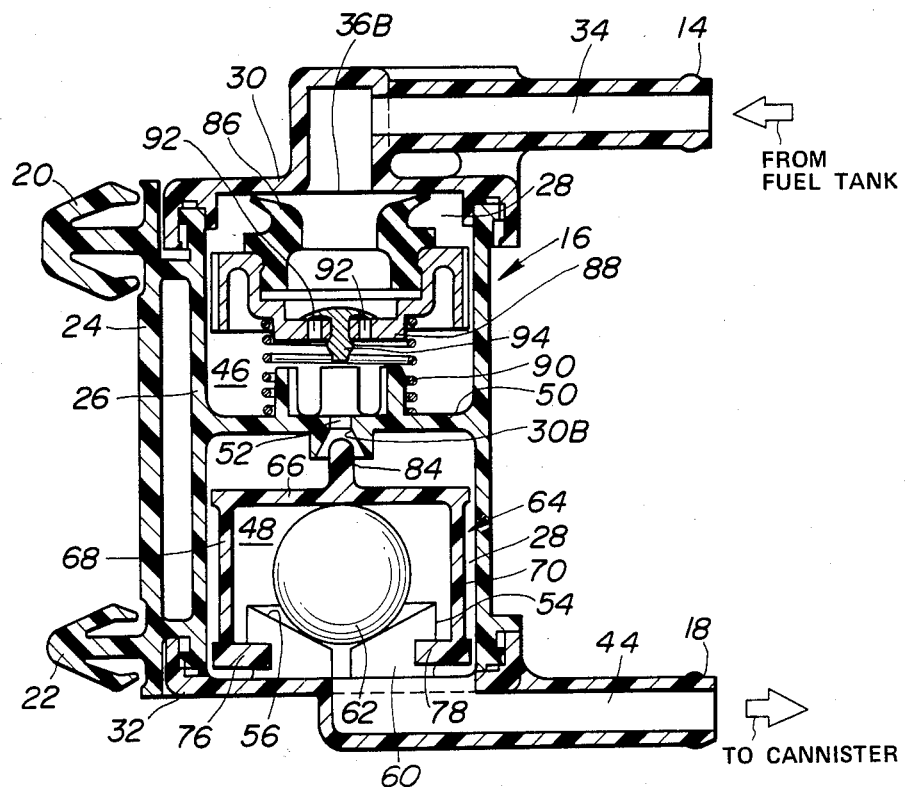
FIG. 7 is a vertical sectional view similar to FIG. 1 showing a third embodiment.

FIG. 7 shows a third embodiment of a roll-over valve which is now generally designated by 16B. Roll-over valve 16B is substantially similar to roll-over valve 16 shown in FIG. 1 except the arrangement wherein a lower chamber portion 48 includes a ball 62 and a follower, while an upper chamber portion 46 includes a disc-like valve element 88, an elastometic annular lip-like valve element 86 and a spring 90. In this embodiment, an opening 52 formed through a partition 50 includes a valve seat 38B on which an upwardly projecting valve element 84 of a top member 66 is adapted to seat, and annular lip-like valve element 86 fixedly carried by disc-like valve element 88 is urged by spring 90 to seat on lower surface portion of top closure member 30 around an inlet opening 36B through which an inlet passage 34 communicates with upper chamber portion 46.

Operation of roll-over valve 16A and that of roll-over valve 16B are quite the same as that of roll-over valve 16.

What is claimed is:

1. A roll-over valve for a motor vehicle having a fuel tank and a cannister, comprising:

a valve body adapted for mounting in a substantially upright position in the motor vehicle, said valve body defining a valve chamber, said valve body including an upper inlet communicating with said fuel tank, and an outlet communicating with said canister, said valve body including a partition by which said valve chamber is divided into an upper chamber portion and a lower chamber portion, said upper inlet communicating with said upper chamber portion, and said outlet communicating with said lower chamber portion;

a raised seat disposed in said upper chamber portion below said inlet and including an upper concave conical surface portion;

a freely movable ball movable in said upper chamber portion and resting on said conical surface, the ball being normally positioned at the center of the conical surface when the valve is upright and rolling up the conical surface when the valve is inclined;

a follower for the ball, said follower being arranged within said upper chamber portion for vertical reciprocal movement in said upper chamber portion by said ball as it rolls on the conical seat, said follower including a top member disposed below said upper inlet and above said ball and adapted to close said inlet upon being moved toward said inlet, whereby said ball urges said follower to move said top member toward said inlet thereby closing said inlet upon inclination of said valve, and said top member of said follower is urged to move downwardly by the pressure differential created between said inlet and said upper chamber portion when said ball has rolled down said conical surface upon returning the valve to the upright position; and valve means for controlling pressure within said upper chamber portion communicating by way of said inlet to said fuel tank, thereby controlling pressure within said fuel tank, said pressure controlling valve means being disposed in said lower chamber portion.

2. A roll-over valve as claimed in claim 1, wherein said pressure controlling valve means includes an elastomeric, annular, lip-like valve element fixedly supported by said partition.

3. A roll-over valve as claimed in claim 1, wherein said pressure controlling valve means includes an elastomeric, annular, lip-like valve element movable to seat on said partition.

4. A roll-over valve for a motor vehicle having a fuel tank and a canister, comprising:

a valve body adapted for mounting in a substantially upright position in the motor vehicle, said valve body defining a valve chamber, said valve body including an inlet communicating with said fuel tank, and an outlet communicating with said canister, said valve body including a partition by which said valve chamber is divided into an upper chamber portion and a lower chamber portion, said inlet communicating with said upper chamber portion, said outlet communicating with said lower chamber portion, and said partition being formed with an opening therein;

a raised seat disposed in said lower chamber portion below said opening and including an upper concave conical surface portion;

a freely movable ball movable in said lower chamber portion and resting on said conical surface, the ball being normally positioned at the center of the conical surface when the valve is upright and rolling up the conical surface when the valve is inclined;

a follower for the ball, said follower being arranged within said lower chamber portion for vertical reciprocal movement in said lower chamber portion by said ball as it rolls on the conical seat, said follower including a top member disposed below said opening and above said ball and adapted to close said opening upon being moved toward said opening whereby said ball urges said follower to move said top member toward said opening thereby closing said opening upon inclination of said valve, and said top member of said follower being urged to move downwardly by the pressure differential created between said upper chamber portion and said lower chamber portion when said ball has rolled down said conical surface upon returning the valve to the upright position; and valve means for controlling pressure within said inlet communicating with said fuel tank, whereby controlling pressure within the fuel tank, said pressure controlling valve means being disposed in said upper chamber portion.

5. A roll-over valve for a motor vehicle having a fuel tank, comprising:

a valve body adapted for mounting in a substantially upright position in the motor vehicle, said valve body defining a valve chamber, said valve body including an upper inlet communicating with said valve chamber and connected to the fuel tank, and an outlet communicating with said valve chamber;

a raised seat disposed in said valve chamber below said inlet and including an upper concave conical surface portion;

a freely movable ball resting on said conical surface, the ball being normally positioned at the center of the conical surface when the valve is upright and rolling up the conical surface when the valve is inclined; and a follower for the ball, said follower being arranged for vertical reciprocable movement in said chamber by said ball as it rolls on the conical seat, said follower including a top member disposed below said upper inlet and above said ball and adapted to close said inlet upon being moved toward said inlet, whereby said ball urges said follower upwardly by contacting said top member upon inclination of the valve, and said follower is urged to move downwardly by pressure differential created between said inlet and the valve chamber when said ball has rolled down said conical surface upon returning the valve to the upright position;

wherein said valve body includes a partition by which said valve member is divided into an upper chamber portion and a lower chamber portion, said upper chamber portion including said raised seat portion, said ball and said follower, said lower chamber portion including means for controlling fluid flow through said partition between said upper and lower chamber portions.

6. A roll-over valve as claimed in claim 5, wherein said fluid flow controlling means includes an elastomeric annular lip-like valve element fixedly supported by said partition.

7. A roll-over valve as claimed in claim 5, wherein said fluid flow controlling means includes an elastomeric annular lip-like valve element movable to seat on said partition.

8. A roll-over valve for a motor vehicle having a fuel tank, comprising:
   a valve body adapted for mounting in a substantially upright position in the motor vehicle, said valve body defining a valve chamber, said valve body including an upper inlet communicating with said valve chamber and connected to the fuel tank, and an outlet communicating with said valve chamber;
   a raised seat disposed in said valve chamber below said inlet and including an upper concave conical surface portion;
   a freely movable ball resting on said conical surface, the ball being normally positioned at the center of the conical surface when the valve is upright and rolling up the conical surface when the valve is inclined; and
   a follower for the ball, said follower being arranged for vertical reciprocable movement in said chamber by said ball as it rolls on the conical seat, said follower including a top member disposed below said upper inlet and above said ball and adapted to close said inlet upon being moved toward said inlet, whereby said ball urges said follower upwardly by contacting said top member upon inclination of the valve, and said follower is urged to move downwardly by pressure differential created between said inlet and the valve chamber when said ball has rolled down said conical surface upon returning the valve to the upright position;
   wherein said valve body includes a partition by which said valve chamber is divided into an upper chamber portion and a lower chamber portion, said lower chamber portion including said raised seat portion, said ball and said follower, said upper chamber portion including means for controlling fluid flow through said partition between said upper chamber portion and said lower chamber portion.

* * * * *